(12) United States Patent
Niermann et al.

(10) Patent No.: US 6,685,558 B2
(45) Date of Patent: Feb. 3, 2004

(54) VARIABLE STRAW AND CHAFF DISTRIBUTION ARRANGEMENT

(75) Inventors: Martin Niermann, Harsewinkel (DE); Dieter Strickmann, Hilter (DE); Jörn Brinkmann, Harsewinkel (DE); Dieter Amsbeck, Harsewinkel (DE); Jürgen Nollmann, Versmold (DE); Martin Perdun, Harsewinnkel (DE); Sergej Kucerin, Vlotho (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/185,594

(22) Filed: Jun. 27, 2002

(65) Prior Publication Data

US 2003/0003974 A1 Jan. 2, 2003

(30) Foreign Application Priority Data

Jun. 27, 2001 (DE) .......................... 101 30 652

(51) Int. Cl.[7] .............................................. A01F 12/40
(52) U.S. Cl. ...................................... 460/111; 460/112
(58) Field of Search ................................ 460/111, 112

(56) References Cited

U.S. PATENT DOCUMENTS 4,292,795 A    10/1981   Linn
5,833,533 A  * 11/1998   Roberg ........................ 460/112
6,500,064 B1 * 12/2002   Schrattenecker ............ 460/112

FOREIGN PATENT DOCUMENTS

| DE | 38 25 125 | 1/1990 | |
|---|---|---|---|
| DE | 195 05 148 | 8/1996 | |
| DE | 43 21 905 | 9/1996 | |
| DE | 297 02 265 | 9/1997 | |
| DE | 196 40 055 | 4/1998 | |
| DE | 199 08 111 | 7/2000 | |
| EP | 0357090 | * 9/1989 | ........... A01F/12/40 |
| EP | 0 357 090 | 3/1990 | |
| WO | WO 01/01754 | 1/2001 | |

* cited by examiner

Primary Examiner—Robert E. Pezzuto
Assistant Examiner—Meredith Petravick
(74) Attorney, Agent, or Firm—Husch & Eppenberger, LLC; Robert E. Muir; Robert C. Haldiman

(57) ABSTRACT

An agricultural harvesting machine has straw walkers or the like, an air sieve device, a straw chopping device, and a variable straw and chaff distribution arrangement. The arrangement includes an articulated lever combination; a servo element associated with the articulated lever combination; preferably two rotary distribution blowers each having a material inlet opening and a rotor circumference and being connected to the articulated lever combination. The rotary blower is movable between two different plane-parallel positions by the articulated lever combination and servo element. A guide is provided for supplying chaff radially to the distribution blower.

10 Claims, 3 Drawing Sheets

VARIABLE STRAW AND CHAFF DISTRIBUTION ARRANGEMENT

TECHNICAL FIELD OF THE INVENTION

The present invention relates generally to agricultural machinery and, more particularly, to a variable straw and chaff distribution arrangement in an agricultural machine.

DESCRIPTION OF THE RELATED ART

This concerns combine harvesters with rack-type straw walkers or with rotating devices for straw separation behind which is mounted a separate straw chopper which is adjoined by one or more distributing blowers. When using a rotating straw separating device, the straw chopping device can be integrated in it, as described in German patent application DE 19 640 055 A1. In this case a rotating transfer cylinder which conveys the crop into the distributing blower or blowers is used instead of the straw chopper.

When operating combine harvesters which are equipped inter alia with a blower for the discharge of chopped straw and chaff, it would be advantageous if one can optionally discharge chopped straw mixed with chaff, or depositing the straw unchopped in swaths and distributing only the chaff.

For this purpose it is already proposed in international application WO 01/01754 that, for chaff distribution, distributor blowers of which the direction of discharge is optionally variable be stationed in the region between the air sieve device and the straw chopper. Discharge and transverse distribution of the chopped straw is effected by the chopper rotor itself and a discharge housing fitted with guide surfaces.

Practical experience has shown that satisfactory distribution of chaff and/or chopped straw is not possible with the known solutions from a given width of the direct-cut attachment without blower assistance.

The present invention is directed to overcoming one or more of the problems set forth above.

SUMMARY OF THE INVENTION

An aspect of the present invention is to provide a variable straw and chaff distribution arrangement that ensures wide distribution of chopped straw and/or chaff with as little expenditure as possible even with wide cutter tables.

In accordance with the invention, there is provided a variable straw and chaff distribution arrangement in an agricultural harvesting having means for separating straw, an air sieve device for separating chaff, and a straw chopping device having an outlet. The arrangement includes an articulated lever combination; means associated with the articulated lever combination for selectively moving the same; at least one rotary blower having a material inlet opening and being connected to the articulated lever combination, said blower being adjustable between at least two different positions by operation of the articulated lever combination; and guide means for supplying chaff radially to the rotary blower.

This aspect is merely illustrative of the innumerable aspects associated with the present invention and should not be deemed as limiting in any manner. This and other aspects, features and advantages of the present invention will become apparent from the following detailed description when taken in conjunction with the drawings.

BRIEF DESCRIPTION OF THE DRAWINGS

Reference is now made more particularly to the drawings which illustrate the best presently known mode of carrying out the invention and wherein similar reference characters indicate the same parts throughout the views.

DETAILED DESCRIPTION

Figure 1:
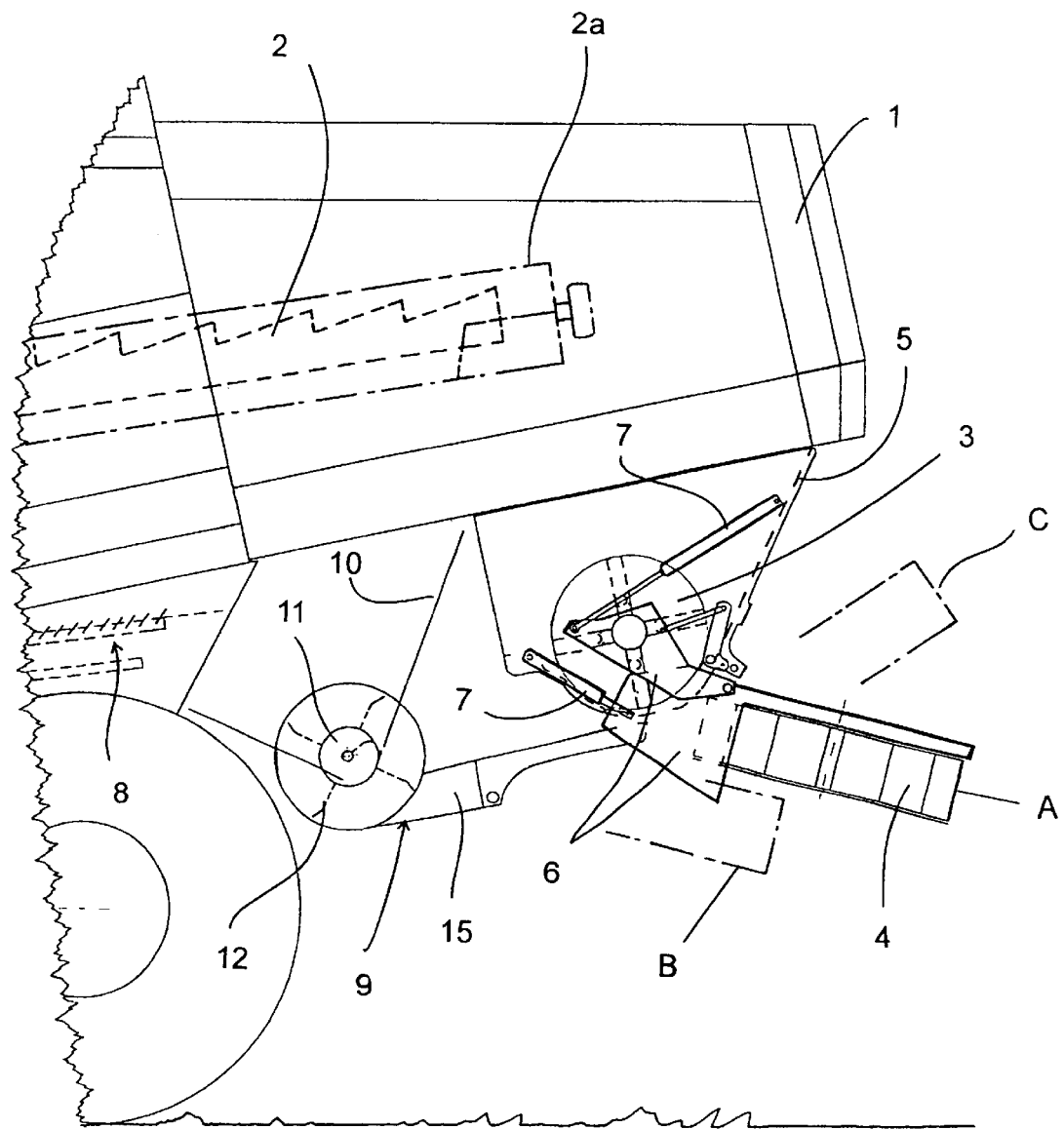
FIG. 1 is a partial side view of a delivery end of a combine harvester incorporating a chaff distribution arrangement according to an embodiment of the present invention and showing a blower in a first operative position in solid lines and moved positions in phantom lines.

Reference numeral 1 denotes the rear of a combine harvester where the outlet end of straw walkers 2 or, alternatively, a rotating separating device 2a is located for separating straw. Below the outlet end is provided a straw chopper 3 which transfers the chopped straw to the outlet opening to one or more blowers 4 which are preferably rotary blowers. For energy conservation, in a position A shown in FIG. 1, the outlet end of the straw chopper 3 advantageously lies in the same plane as the material inlet opening of the distribution blower 4.

If there are multiple blowers 4, they are preferably arranged adjacent each other for the purpose of wide distribution. When the straw is to be deposited in a swath without passing through the chopper 3, a pivotable flap 5 is provided for this purpose. The blower or blowers 4 can be moved by articulated lever combinations 6 and servo cylinders 7 to two different operative positions A and B in which the blowers lie in planes which are parallel. The significance of this will be described below.

Figure 4:
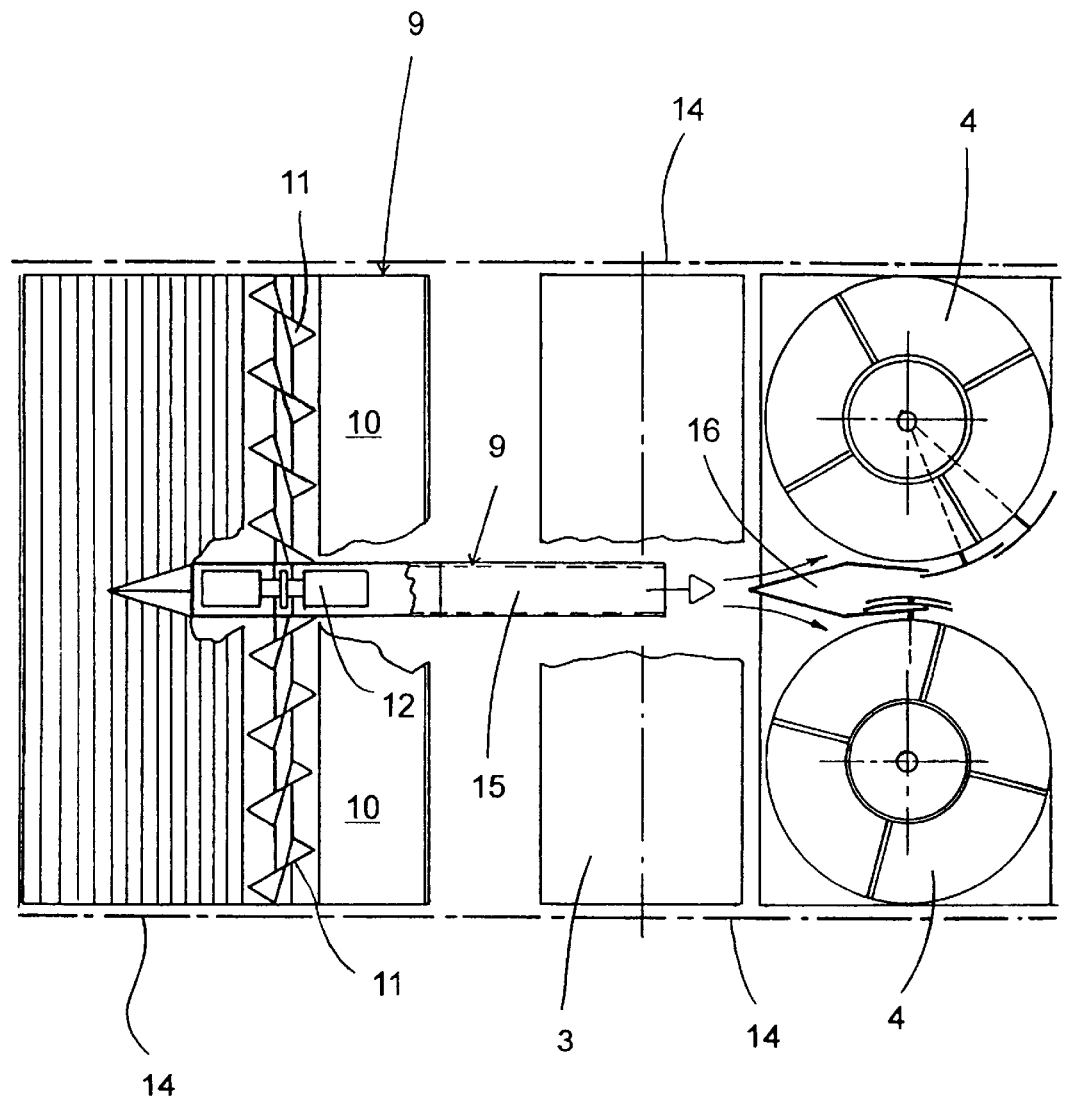
FIG. 4 is a top view of a chaff distribution arrangement having multiple blowers.

An air sieve cleaning device 8 is located on the combine harvester for separating chaff, and from there the chaff passes to a transfer device 9. Transfer device 9 contains a wall element 10 which catches the chaff discharged by the air sieve device 8 and feeds it to the counter-rotating collecting spiral conveyors 11 (see FIG. 4) which transfer the accumulated chaff to a paddle conveyor 12. Paddle conveyor 12 is arranged centrally on the longitudinal axis of the combine between the sidewalls 14 and conveys the chaff along a channel-like guide 15 centrally between the adjacent blowers 4. Between the latter is arranged, facing towards the paddle conveyor 12, a wedge-shaped guide element 16 which apportions the stream of chaff centrally to the two blowers 4, radially on the circumference thereof. Via the channel-like guide 15, the chaff is conducted to the stream of chopped straw (position A of the blower 4 in FIG. 1) or directly, without admixing straw, into the blower 4 (position B of the blower). A position C of the blower 4 (see FIG. 1) is a non-working position to which the blower 4 may be moved to provide access to adjacent machine elements for servicing work.

Figure 2:
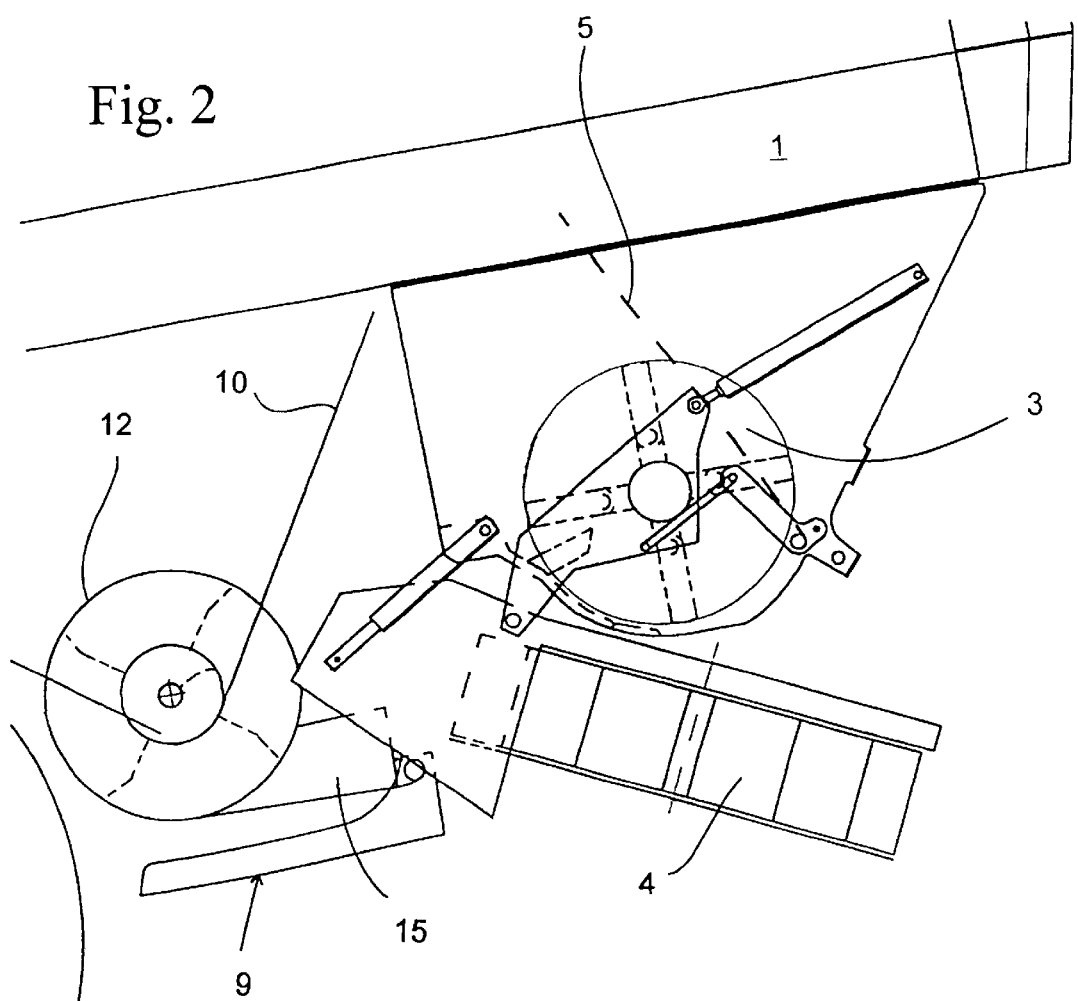
FIG. 2 is a side view of the chaff distribution arrangement on a larger scale than FIG. 1 and a second operative position of the blower.
Figure 3:
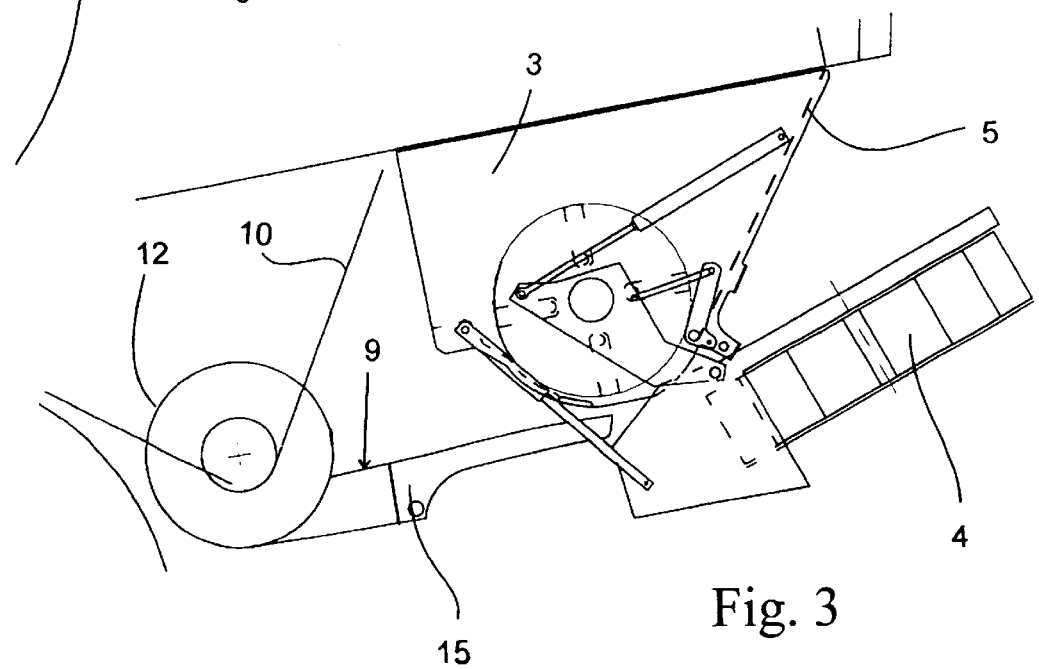
FIG. 3 is a side view of the chaff distribution arrangement shown in FIG. 2 with the blower in an inoperative, moved position.

From the drawings (in particular FIG. 2) it can be seen that in position B of the blowers 4 the unchopped straw is deposited in a swath with the chopper drive switched off. Note that at position B the flap 5 in a moved position as compared to position A of the flap shown in FIG. 1. In this moved position B the chaff passes directly for wide distribution to the blower or blowers 4 with corresponding displacement of a section of the guide 15.

In summary, in position A the blower or blowers 4 spread both chaff and chopped straw. In position B the blower or blowers 4 spread only chaff and the unchopped straw is deposited in a swath for subsequent harvesting, for example.

Other objects, features and advantages of the present invention will be apparent to those skilled in the art. While preferred embodiments of the present invention have been illustrated and/or described, this has been by way of illustration and the invention should not be limited except as required by the scope of the appended claims and their equivalents.

What is claimed is:

1. A variable straw and chaff distribution arrangement in an agricultural harvesting machine having means for separating straw, an air sieve device for separating chaff, and a straw chopping device having an outlet, the arrangement including:
   an articulated lever combination;
   means associated with the articulated lever combination for selectively moving the same;
   at least one rotary blower having a material inlet opening and being connected to the articulated lever combination, said blower being adjustable between at least three different positions by operation of the articulated lever combination; and
   variable guide means for supplying chaff radially to the rotary blower.

2. A variable straw and chaff distribution arrangement according to claim 1, wherein the different positions of the rotary blower include two plane-parallel positions.

3. A variable straw and chaff distribution according to claim 1, further including a pivotable flap which is movable between a position for feeding straw to the straw chopping device and a position for blocking flow of straw to the straw chopping device thereby allowing the supply of straw to bypass the straw chopping device.

4. A variable straw and chaff distribution according to claim 1, further including:
   a second distribution blower;
   a wall element arranged vertically between the straw chopping device and the air sieve device;
   a collecting spiral conveyor located generally below the wall element;
   a paddle conveyor operatively connected with the collecting spiral conveyor;
   a wedge-shaped guide element operatively connected with the paddle conveyor by the guide means and arranged centrally between the distribution blowers; and
   wherein the wall element catches chaff and directs it to the collecting spiral conveyor, said collecting spiral conveyor then directs the chaff to the paddle conveyor which then directs it to the guide element via the guide means and wherein the guide element divides the chaff between the distribution blowers.

5. A variable straw and chaff distribution arrangement in an agricultural harvesting machine according to claim 1, wherein the distribution blower is adjustable to a non-working position by the articulated lever combination and said means associated with the articulated lever combination for selectively moving the same.

6. A variable straw and chaff distribution arrangement in an agricultural harvesting machine having means for separating straw, an air sieve device for separating chaff, and a straw chopping device having an outlet, the arrangement including:
   a wall element arranged vertically between the straw chopping device and the air sieve device;
   an articulated lever combination;
   means associated with the articulated lever combination for selectively moving the same;
   first and second distribution blowers, each blower having a material inlet opening and being connected to the articulated lever combination, said distribution blowers being adjustable between at least two different positions by operation of the articulated lever combination, wherein the outlet of the straw chopping device lies in a plane of the material inlet opening of the distribution blowers;
   guide means for supplying chaff radially to the rotary blower;
   a collecting spiral conveyor located generally below the wall element;
   a paddle conveyor operatively connected with the collecting spiral conveyor;
   a wedge-shaped guide element operatively connected with the paddle conveyor by the guide means and arranged centrally between the distribution blowers; and
   wherein the wall element catches chaff and directs it to the collecting spiral conveyor, said collecting spiral conveyor then directs the chaff to the paddle conveyor which then directs it to the guide element via the guide means and wherein the guide element divides the chaff between the distribution blowers.

7. A variable straw and chaff distribution arrangement in an agricultural harvesting machine having means for separating straw, an air sieve device for separating chaff, and a straw chopping device having an outlet, the arrangement including:
   a rotary blower having a material inlet opening;
   an articulated lever combination for adjusting the rotary blower between first and second working positions operatively connected to the rotary blower;
   means associated with the articulated lever combination for selectively moving the same;
   variable guide means for supplying chaff radially to the rotary blower; and
   a pivotable flap which is movable between a feeding position for feeding straw to the straw chopping device when the rotary blower is in the first working position and a blocking position for blocking flow of straw to the straw chopping device when the rotary blower is in the second working position.

8. A variable straw and chaff distribution arrangement in an agricultural harvesting machine according to claim 7, the arrangement further including:
   a second rotary blower; and
   a wedge-shaped guide element for dividing chaff between the blowers arranged adjacent the guide means and centrally between the blowers.

9. A variable straw and chaff distribution arrangement in an agricultural harvesting machine according to claim 7, the arrangement further including:
   a wall element arranged vertically between the straw chopping device and the air sieve device;
   a collecting spiral conveyor for collecting and conveying chaff located generally below the wall element; and
   a paddle conveyor for conveying chaff to the blower operatively connected with the collecting spiral conveyor.

10. A variable straw and chaff distribution arrangement in an agricultural harvesting machine according to claim 9, the arrangement further including:
    a second rotary blower; and
    a wedge-shaped guide element for dividing chaff between the blowers operatively connected with the paddle conveyor adjacent the guide means and arranged centrally between the blowers.

* * * * *